United States Patent [19]

Myers

[11] 4,089,554
[45] May 16, 1978

[54] CAMPER COOKING AND DINING UNIT

[76] Inventor: Donald R. Myers, 6757 Judistine Dr., Fair Oaks, Calif. 95628

[21] Appl. No.: 729,466

[22] Filed: Oct. 4, 1976

[51] Int. Cl.² .............................................. B60R 7/08
[52] U.S. Cl. ........................... 296/24 A; 224/42.03 A; 312/262
[58] Field of Search ...................... 296/24 R, 24 A, 26, 296/27; 224/42.43, 42.44, 42.03 R, 42.03 A, 42.07, 42.08; 312/258, 262, 282, 283, 301, 302

[56] References Cited

U.S. PATENT DOCUMENTS

| 1,632,476 | 6/1927 | Holderman | 312/258 |
| 2,576,385 | 11/1951 | Bigsby | 224/42.44 |
| 2,746,659 | 5/1956 | Caruolo | 224/42.07 |
| 3,543,890 | 12/1970 | Criswell | 312/282 |

Primary Examiner—Joseph F. Peters, Jr.
Assistant Examiner—John A. Carroll
Attorney, Agent, or Firm—Blair & Brown

[57] ABSTRACT

A camper cooking and dining unit which can be withdrawn from the rear of a stationwagon or truck and unfolded to produce a complete kitchen and table unit for dining and cooking meals. The unit includes an icebox, cooking stove, wash basin and many storage compartments for food and cooking and dining utensils. The unit is supported by arms extending from the bumper of the vehicle which hinge as the unit is unfolded.

5 Claims, 7 Drawing Figures

CAMPER COOKING AND DINING UNIT

BACKGROUND OF THE INVENTION

1. Field of the Invention

The present invention relates to a collapsable cooking and dining unit for stationwagons or truck campers.

2. Summary of the Invention

A combined collapsable cooking and dining unit for use with stationwagon or truck campers which includes an icebox, wash basin, cook stove and compartments for food stuffs, cooking utensils and dining utensils. The compartments are supported from an arm pivoted to the bumper of the vehicle with the arms swingable as the unit is folded and unfolded.

The primary object of the invention is to provide a compact cooking and dining unit which can be stored in a stationwagon or pick-up camper and which can be opened to the rear of the vehicle and supported from the vehicle.

Other objects and advantages will become apparent in the following specification when considered in light of the attached drawings.

DESCRIPTION OF THE PREFERRED EMBODIMENT

Figure 1:
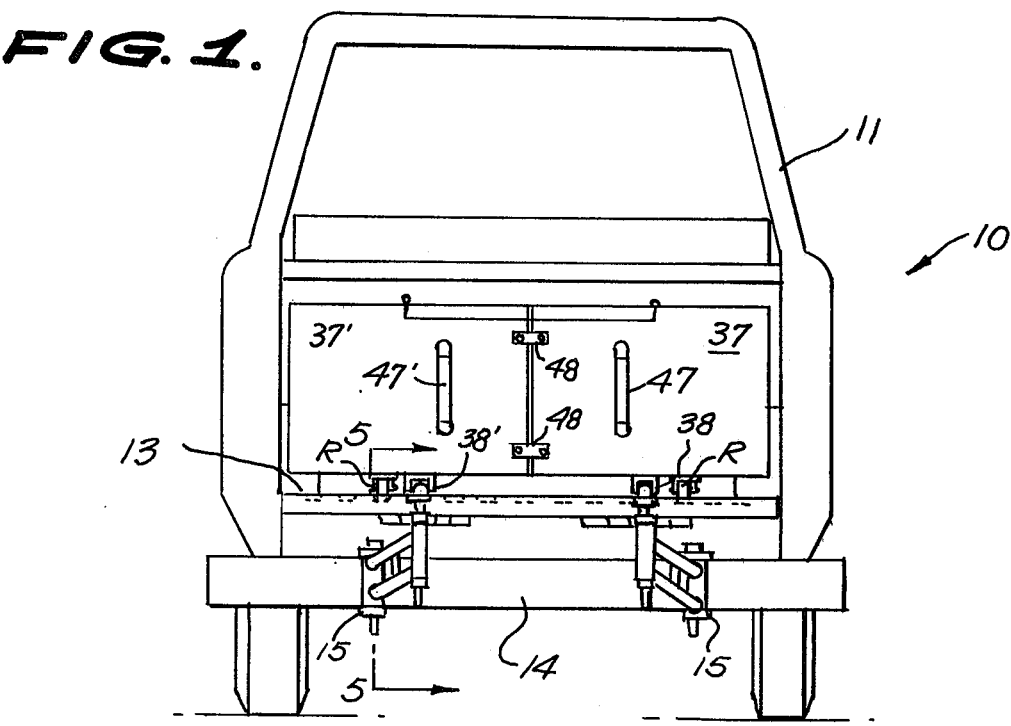
FIG. 1 is a rear elevation of the invention with the unit in closed position but extending from the rear of the vehicle.

Referring now to the drawings in detail, wherein like reference characters indicate like parts throughout the several figures, the reference numeral 10 indicates generally a cooking and dining unit constructed in accordance with the invention.

The unit 10 is adapted for use with a vehicle 11 of the type having a tail gate 12, floor 13 and a rear bumper 14.

Figure 5:
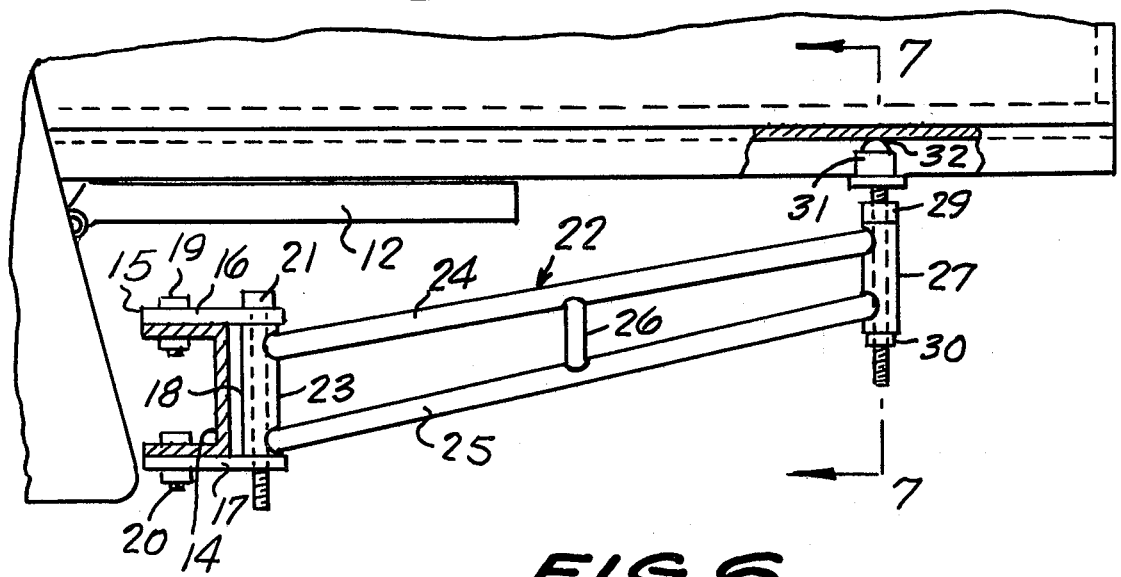
FIG. 5 is a fragmentary side elevational view shown partially broken away and in section for convenience of illustration.
Figure 6:
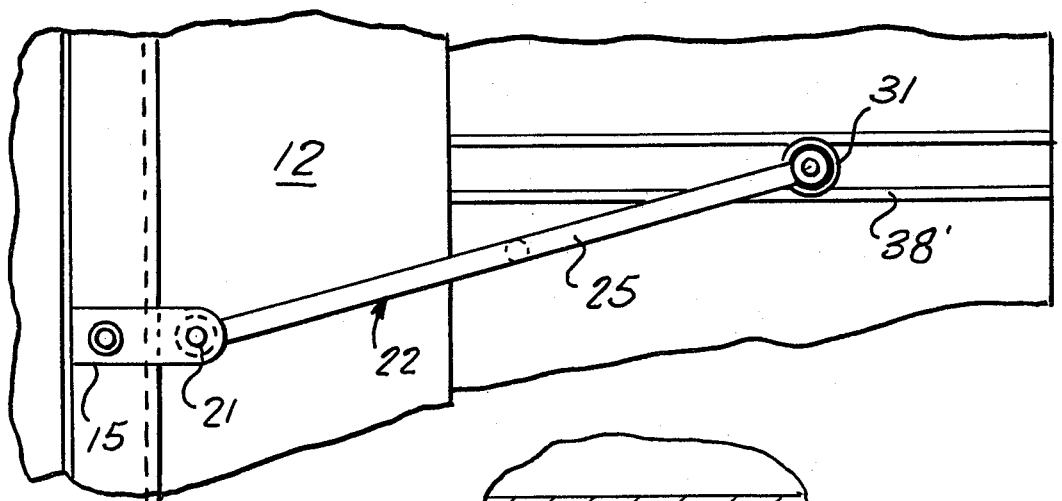
FIG. 6 is a bottom plan view of the structure illustrated in FIG. 5.
Figure 7:
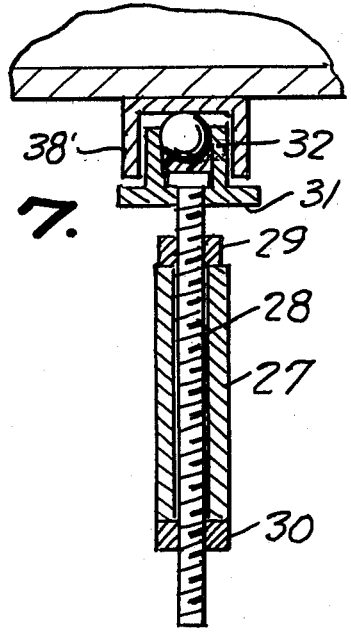
FIG. 7 is an enlarged fragmentary vertical sectional view taken along the line 7—7 of FIG. 5 looking in the direction of the arrows.

A bracket 15 is secured to each side of the bumper 14 and includes a top plate 16, a bottom plate 17 spaced below the top plate 16 and parallel thereto connected by an upright plate 18 as can be best seen in FIG. 5. The plate 16 is connected to the bumper 14 by a bolt 19 and the plate 17 is connected to the bumper 14 by a bolt 20. The plate 16,17 extend rearwardly of the bumper 14 beyond the vertical plate 18 sufficiently to permit a pin 21 to be inserted vertically through the plates 16, 17 rearwardly of the plate 18. An arm generally indicated at 22 has a sleeve 23 at one end which is pivotally mounted on the pin 21 between the plates 16, 17 as can be seen in FIG. 5. A pair of tubular frame members 24, 25 are secured at one end to the sleeve 23 and extend outwardly and upwardly at a converging angle from the sleeve 23. The tubular frames 24, 25 are connected intermediate their opposite ends by a center post 26 and at their outer ends by a sleeve 27 which is parallel to the sleeve 23. An elongate threaded shaft 28 extends through the sleeve 27 and is tightly secured thereto by lock nuts 29, 30 at their respective upper and lower ends. The upper end of the threaded shaft is provided with a bearing mount 31 rigidly secured thereto and having a single ball bearing 32 mounted therein and extending upwardly therefrom for reasons to be assigned.

Figure 3:
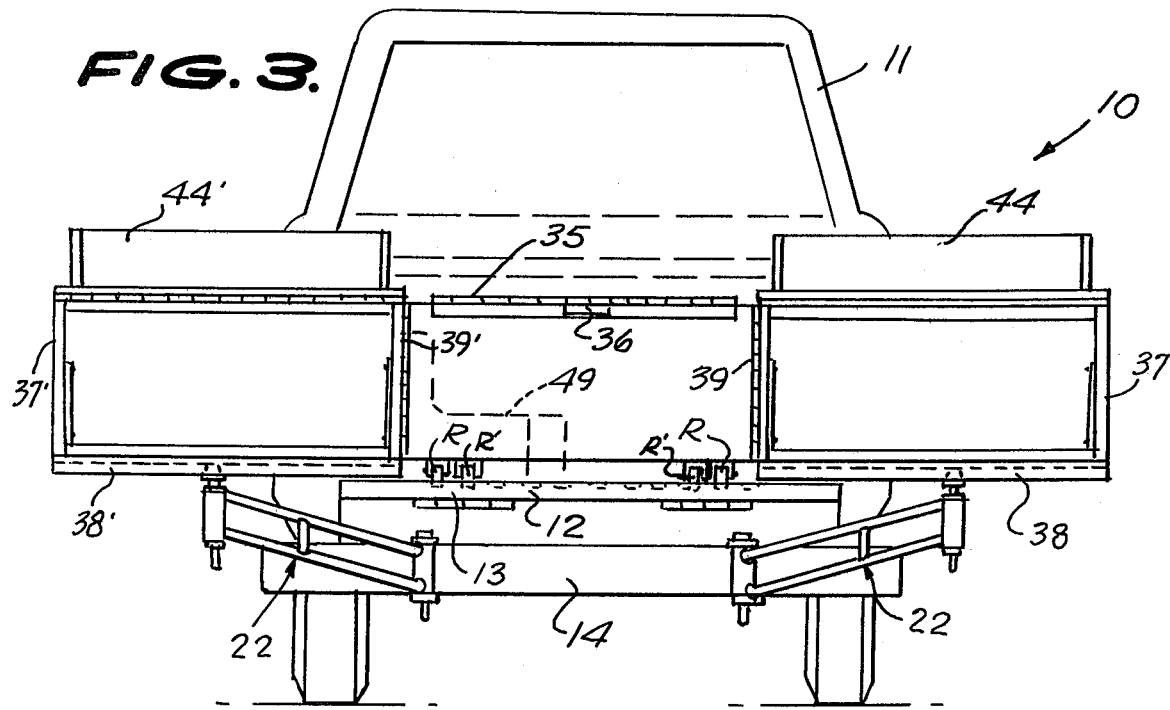
FIG. 3 is a rear view of the unit in open position ready for use.

The unit 10 includes a central generally rectangular icebox 33 having a lid 34 secured thereto by a piano hinge 35. A handle 36 is provided for opening the lid 34 for access to the icebox 33. A generally rectangular right hand compartmented box 37 is provided with a channel track 38 extending longitudinally therealong with the box 37 enclosed, folded position. The box 37 is connected by an upright piano hinge 39 to one of the outer rear corners of the icebox 33. The box 37 is provided with a shallow compartment 40 and a deep compartment 41 along one side thereof with the shallow compartment engaging over the wheel well of the vehicle with the unit stored within the vehicle. A lid 42 is secured by a piano hinge 43 extending horizontally and longitudinally of the box 37 with the lid 42 opening to a position overlying the compartments 40, 41 and having an upstanding wall 44 formed thereon to provide a protected shelve when the lid 42 is in open position as illustrated in FIG. 3.

A door 45 is hinged to one side of the box 37 and by a generally horizontal longitudinally extending hinge and is provided with braces 46 to support the door 45 in a horizontal position when open. A handle 47 is secured to one end of the box 37 for moving the unit 10 from storage to open position and for unfolding the box 37. A box 37' is provided with a longitudinally extending channel track 38' secured to the bottom thereof as can be best seen in FIG. 2. The box 37' is secured to the icebox 33 by a vertical piano hinge 39'. The box 37' is a mirror reversal of the box 37 but otherwise is identical in structure and includes a open top shallow compartment 40' and an open top deep compartment 41' extending from the top surface of the box 37'. A lid 42' is secured by a longitudinally extending piano hinge 43' to the box 37' and has a wall 44' on the lower side thereof to prevent material from being dislodged from the shelve 42' formed by opening the lid 42'. A door 45' is hinged horizontally to the box 37' and is secured by braces 46' in its open horizontal position. A handle 47' is provided for moving the box 37' to and from its open position and to and from its storage position.

The bearing support 31 is adapted to be received in the channel track 38 and the channel track 38' on each side of the unit 10 so as to support the boxes 37, 37' in their fully extended as well as their partially extended positions of use. The arms 22 swing on the bumper 14 with the bearing 32 traveling along the tracks 38, 38' as the boxes 37, 37' are swung on their hinges 39. The arms 32 continue to support the boxes 37, 37' until they are pushed inwardly of the vehicle 11 and are supported thereby.

Rollers R on the inner end of the unit roll on the truck bed and rollers R' at the rear of the truck bed engage in and support the channel tracks 38, 38'.

Figure 4:
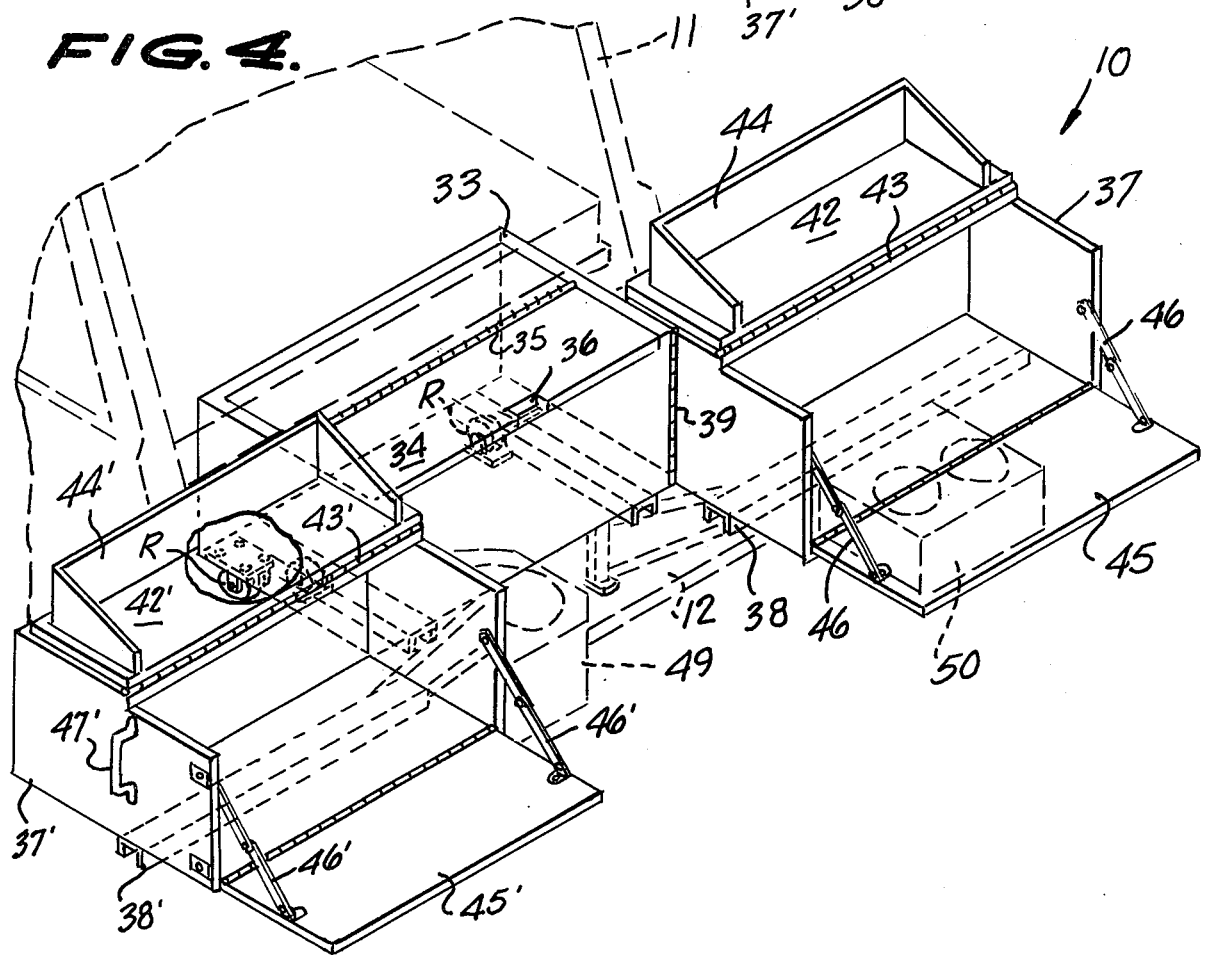
FIG. 4 is a perspective view of the open unit of FIG. 3.

Latches 48 are provided on the rear of the boxes 37, 37' to secure the boxes 37, 37' together as they are moved to and from their storage position within the vehicle 11. It should be noted that a basin 49 can be supported on the box 37' and a propane stove 50 can be supported on the door 45 when in open position as can be seen in FIG. 4.

Figure 2:
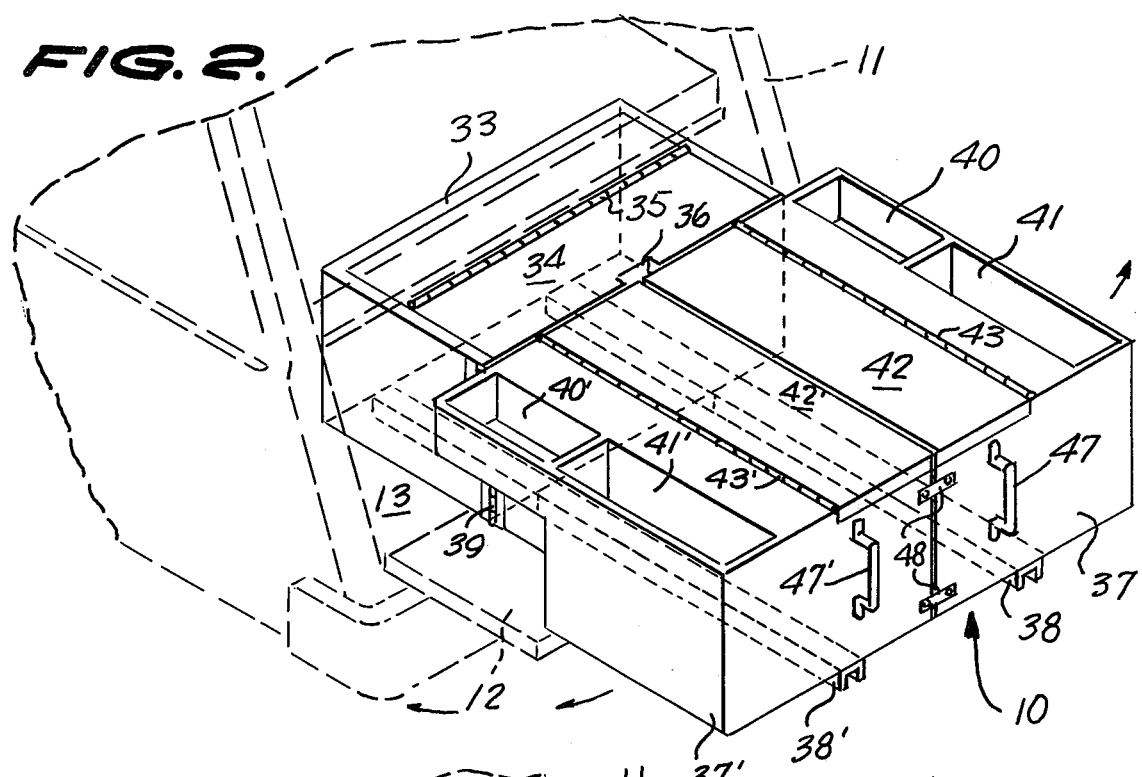
FIG. 2 is a perspective view of the FIG. 1 structure.

In the use and operation of the invention the unit 10 is stored within the vehicle 11 with the boxes 37, 37' secured together by the latches 48. Prior to lowering the tail gate 12 the arms 22 are fitted between the plates 16, 17 and secured thereto by the pin 21 as the unit 10 is then slowly withdrawn from the vehicle 11 the bearing support 31 and bearing 32 is engaged respectively in the tracks 38, 38' so that the unit 10 is supported by the arms 22. With the unit 10 in its fully extended position as illustrated in FIG. 2 the latches 48 are disconnected and the boxes 37, 37' are swung outwardly with the arms 22 moving therewith to support the boxes 37, 37' in their fully extended position as illustrated in FIG. 4. The basin 49 and stove 50 can then be positioned and the unit is ready for use for cooking, cleaning and dining.

Having thus described the preferred embodiment of the invention it should be understood that numerous structural modifications and adaptations may be resorted to without departing from the spirit of the invention.

What is claimed is:

1. A collapsable cooking and dining unit for use with a motor vehicle of the type having a floor and a rear bumper comprising a central generally rectangular box, a pair of generally rectangular boxes hingedly secured to the rear corners of said central generally rectangular box and moveable to a position extending substantially perpendicularly outwardly of said central generally rectangular box, a track underlying each of said pair of boxes and means detachably secured to the bumper of the vehicle engaging in said track for supporting said boxes in their extended position comprising bearing means disposed on a shaft which rides in said track, and an arm connecting said shaft to said rear bumper by bracket means.

2. A device as claimed in claim 1 including a door on each of said boxes hinged on a horizontal axis to lower for use as a shelf when in the extended position.

3. A device as claimed in claim 1 including a lid on each of said pair of boxes hinged to said pair of boxes along a horizontal axis to open as a shelf.

4. A device as claimed in claim 3 including a wall on the underside of each of said lids to project upwardly when said lid is open.

5. A device as claimed in claim 1 including means for securing said boxes in closed position for storage on the floor of said vehicle.

* * * * *